United States Patent [19]

Krauss et al.

[11] 4,188,833

[45] Feb. 19, 1980

[54] SHIP TRANSMISSION

[75] Inventors: Siegfried Krauss; Gerhard Maurer, both of Friedrichshafen, Fed. Rep. of Germany

[73] Assignee: Zahnradfabrik Friedrichshafen AG, Friedrichshafen, Fed. Rep. of Germany

[21] Appl. No.: 865,300

[22] Filed: Dec. 28, 1977

[51] Int. Cl.² .......................... F16H 3/14; B63H 23/02
[52] U.S. Cl. .......................................... 74/417; 74/404
[58] Field of Search .................. 74/416, 417, 404, 423

[56] References Cited

U.S. PATENT DOCUMENTS

| | | | |
|---|---|---|---|
| 2,164,487 | 7/1939 | Beckjord | 74/417 X |
| 3,503,274 | 3/1970 | Howard | 74/417 X |
| 3,803,934 | 4/1974 | Yokel | 74/417 X |

*Primary Examiner*—William E. O'Dea
*Assistant Examiner*—Harold Joyce
*Attorney, Agent, or Firm*—Karl F. Ross

[57] ABSTRACT

A transmission is disclosed for use in ship drive arrangements. The transmission comprises a gear train having three main axes inclined and in parallel with respect to each other. The gear wheels of the gear train are selectively coupled to the main axes to transfer motive power from the input side of the transmission to the output side. The system affords space saving arrangements depending on the type of motor that is employed for the drive assembly.

9 Claims, 9 Drawing Figures

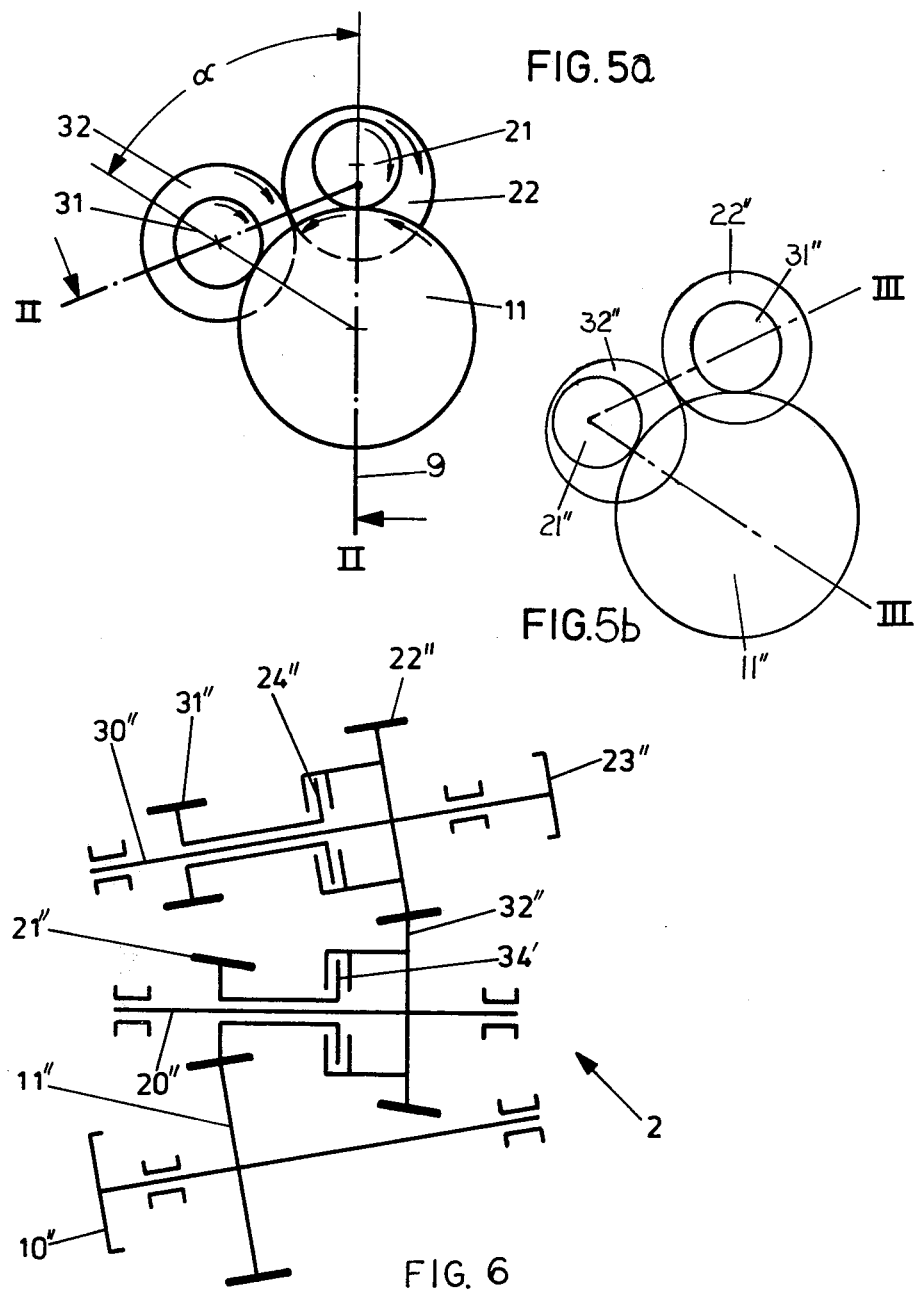

SHIP TRANSMISSION

FIELD OF THE INVENTION

The present invention relates to a transmission and, more particularly, to a reversing gear transmission for ship engines.

BACKGROUND OF THE INVENTION

It is usually desirable to arrange the drive assembly of ship engines towards the stern of the vessel. Also, the overall height of the power train should be maintained within as low limits as possible. A typical drive arrangement normally comprises a motor having either a deep or a shallow oil pan or sump. In accordance with the available space, the design of the stern part of the vessel is governed by the type of oil pan that is used, either deep or shallow and either a transmission arrangement having parallel input and output shafts or a transmission arrangement having inclined input and output shafts with respect to each other will provide the desired space-saving solution. To date, the prior art has failed to provide a transmission system which can readily achieve the two transmission systems without resorting to duplication in design and construction.

In known reversing gear transmissions, as briefly defined above, the output shaft is inclined with respect to the input shaft and the intermediate shaft, as shown in German published patent application (DT-OS) No. 2,059,820 and German published patent application (DT-OS No. 2,358,778. A bevel gear mounted on the inclined output shaft meshes with a spur gear mounted on the input shaft and the spur gear of the intermediate shaft, which latter spur gear is preferably also formed as a bevel gear. The intermediate shaft is linked, in turn, by a further pair of gears with the input shaft. As the direction of motion of the system is selected, the output shaft is actuated either by the gear on the input shaft or by the gear on the output shaft.

A further transmission assembly is shown in German published patent application (DT-OS) No. 1,909,414 in which it is disclosed to exchange the output shaft and the input shaft together with their respective components in order to achieve a stream-lined design. Both shafts are, however, parallel with respect to each other and, thus, the relative position of the input shaft and the output shaft remains the same, i.e. parallel.

Another transmission arrangement for ships is described in MTZ, Vol. 35, No. 11, 1974 on page 382. In this arrangement, the output shaft is inclined with respect to one of the several other shafts and the output shaft is parallel with respect to a third shaft whereby one of the two shafts is functioning as input shaft and the other as intermediate shaft. This known transmission does not provide for reversing in the system and it does not afford utilization of the transmission, selectively, as transmission having parallel or inclined main shafts, through the exchange of the input shaft components with intermediate shaft components.

OBJECTS OF THE INVENTION

It is therefore an object of the present invention to provide a widely applicable transmission.

Another object is the provision of a transmission which can be converted from a system having parallel oriented shafts into a system having inclined shafts with respect to each other.

Yet another object of the present invention is to provide a transmission which comprises interchangable subassemblies for easy and efficient conversion to the desired system.

SUMMARY OF THE INVENTION

According to the present invention a transmission is provided which comprises a gear train having three main axes. Upon interchanging of common components, the transmission can provide two transmission systems. A first system comprises parallel main shafts while in the converted system the main shafts are inclined with respect to each other. By arranging the three main axes in accordance with the present invention, so that the output shaft is parallel with respect to a second shaft and inclined with respect to a third shaft, a selection can be made to utilize either of the other shafts, i.e. the parallel or the inclined shaft, in the transmission of motive power.

Transfer of the power between the inclined shafts is effectively achieved through utilization of bevel gears. The gears are coupled to each other and to the axes in order to provide the desired power transfer.

In accordance with one feature of the invention a double-acting clutch is provided for coupling of the gears on the input shaft in dependence with the direction of the input motion.

DESCRIPTION OF THE DRAWING

The above and other objects, features and advantages will become apparent from the following description, reference being made to the accompanying drawing in which:

FIG. 5a is a schematic side elevational view of the transmission with its output shaft inclined to its input shaft and corresponding to FIGS. 2, 3 and 4;

FIG. 5b is a schematic side elevational view of the transmission with its output shaft parallel to its input shaft and corresponding to the arrangement shown in FIG. 6;

FIG. 6 is a line representation similar to FIG. 3 showing a further embodiment of the present invention in which the input shaft and the output shaft extend parallel with respect to each other;

SPECIFIC DESCRIPTION

As can best be seen in FIGS. 2, 3, 4 and 5, a transmission arrangement, generally designated by the numeral 1, is provided comprising an input and an output shaft inclined with respect to each other. Numeral 2 designates a similar transmission in which the input shaft and the output shaft are parallel with respect to each other, see FIG. 6. The detailed description below refers primarily to the system having inclined shafts, however, it will be appreciated that the features of the invention are equally applicable to a system having parallel shafts.

Figure 7:
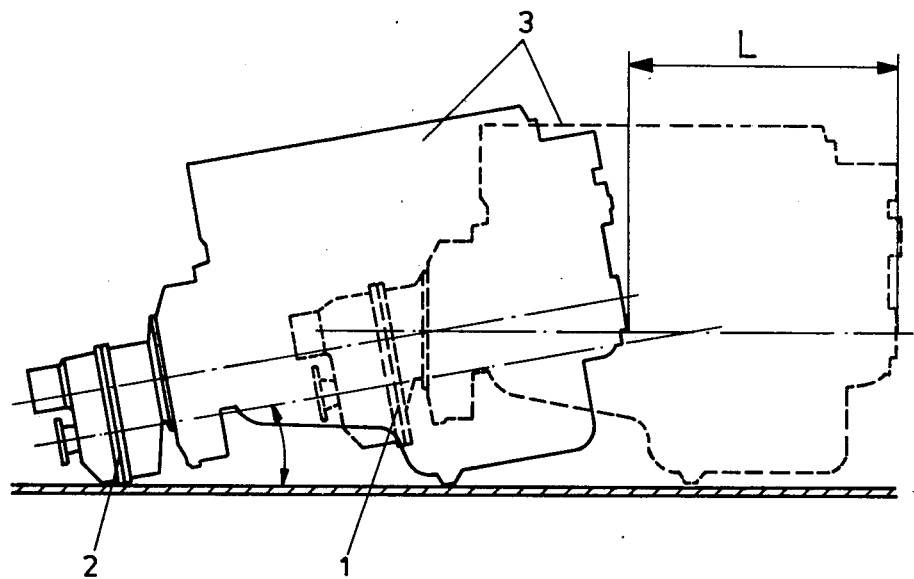
FIG. 7 shows in side elevation the drive assembly comprising a motor having a deep oil pan.
Figure 8:
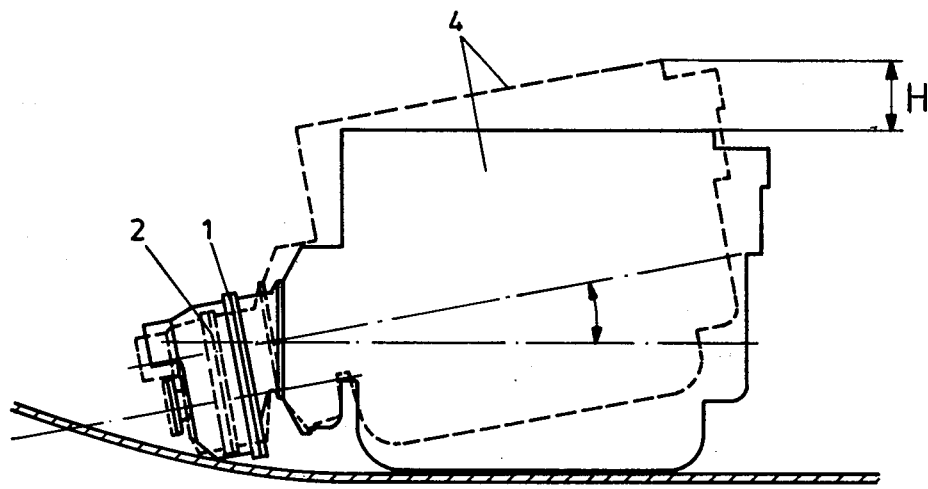
FIG. 8 is an elevation similar to FIG. 7 showing a drive assembly comprising a motor with shallow oil pan.

A drive system in accordance with the present invention can comprise a motor or engine 3 having a deep oil pan, as depicted in FIG. 7, or an engine or motor 4 with a more shallow oil pan, as shown in FIG. 8. Depending on the available space, a transmission 2, i.e. of the type having a parallel arrangement of the input shaft with respect to the output shaft, is utilized or a transmission 1, i.e. of the type having an inclined input shaft with respect to the output shaft, provides the least space-consuming solution, which is shown, respectively, in solid lines in FIGS. 7 and 8, while the more space consuming mode is shown, respectively, in dash lines in FIGS. 7 and 8.

In other words, a drive arrangement comprising a motor 3 having a deep oil pan can be positioned more closely to the power receiving machinery, not shown, when the transmission of the type having parallel shafts, designated by numeral 2 is attached to the motor 3. The space that is saved is indicated by the letter 'L' in FIG. 7 in contradistinction with the transmission of the type having inclined input and output shafts, shown in dash lines in FIG. 7. Similarly, a drive arrangement comprising a motor 4 with a more shallow oil pan affords a lower overall height when utilizing a transmission having input and output shafts oriented in parallel. The reduction in height is indicated in FIG. 8 by the letter 'H'.

Figure 1:
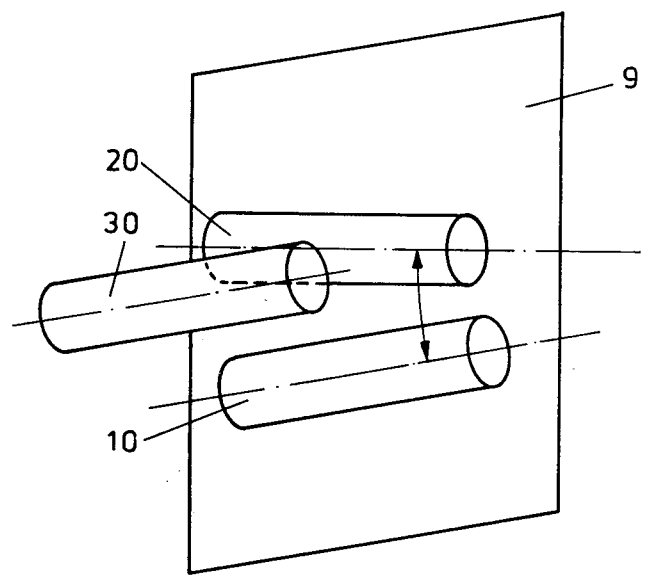
FIG. 1 shows in schematic representation the position of the three main shafts with respect to a common plane.

As indicated in FIG. 1, output shaft 10 is positioned inclined with respect to input shaft 20 while both shafts are in a common plane designated 9. Intermediate shaft 30 extends parallel to output shaft 10, however, in a different plane and slanted with respect to input shaft 20.

Figure 2:
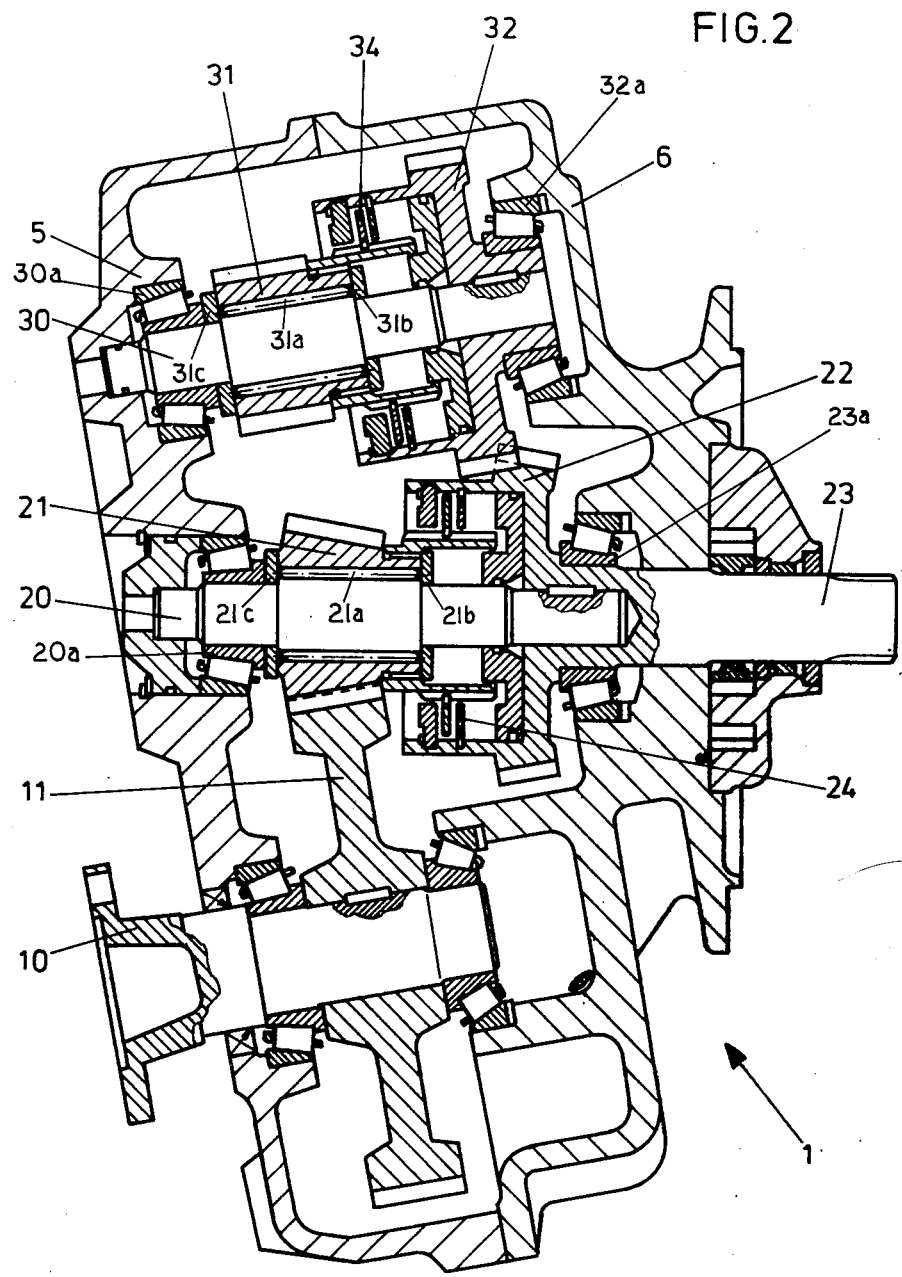
FIG. 2 shows in cross-section a first embodiment of the invention in which the output shaft is inclined with respect to the input shaft.

As can best be seen in FIG. 2, the system is arranged in a housing comprising an output-side housing portion 5 and an input-side housing portion 6. Input shaft 20 and intermediate shaft 30 are journalled in the wall of housing portion 5 with one end while the other ends of the shafts communicate with gears 22 and 32 which gears have shaft portions which in turn are journalled in the wall of input-side housing portion 6. Output shaft 10 carrying gear 11 is journalled directly in the walls of the housing portions 5 and 6.

In more detail, input shaft 20 is journalled in a tapered roller bearing 20a and keyed to input end 23. Input end 23 of shaft 20 is journalled in a tapered roller bearing 23a while its other end comprises a first input gear 22. Preferably this gear is a bevel gear, however it can also be formed as a cylindrical gear. Gear 22 comprises a clutch 24 which is secured by threaded fasteners with its output part to the radial portion of gear 22 or, alternatively, the output part of the clutch 24 is integrally formed with the gear 22. A second input gear 21 is journalled by needle bearing 21a on onput shaft 20. Gear 21 is axially fixed by a pair of retaining plates or washers 21b and 21c.

The fixed first gear 22 meshes with reversing gear 32 as will be described in greater detail below. Reversing gear 32 is keyed to intermediate shaft 30. This gear 32 is also referred to as fixed intermediate gear 32. Gear 32 is formed similar to fixed input gear 22 but it does not comprise an extended input end. Shaft 30 also receives an axially fixed gear 31. This gear 31 is journalled on needle bearing 31a and is held axially fixed between two retaining discs or washers 31b and 31c. The reversing or intermediate gear subassembly also comprises a clutch 34 which is of a design similar to that of clutch 24 of the input shaft assembly. The shaft 30 is journalled in the walls of housing 5 and 6 by tapered roller bearings 30a and 32a, respectively.

As can best be seen in FIG. 2, shaft 10 is journalled in tapered roller bearings 10a and 10b in the lower section of the housing portions 5 and 6. Gear 11 is keyed to the shaft and the gear can cooperate with the gear 31, also referred to as pinion 31 and with the second input gear 21 on input shaft 20. The meshing of the gears can best been seen with reference to FIG. 5.

As can be seen from FIGS. 5a of which FIG. 2 is a section along the line II—II, the pinions 31 and 21 mesh with the gear 11.

On closure of clutch 24 the power flow thus proceeds from the input shaft 23 via the pinion 21 to the gear 11 and upon closure of clutch 34 via the gears 22 and 32 to the pinion 31 and from the latter to the gear 11 of the output shaft 10.

Figure 4:
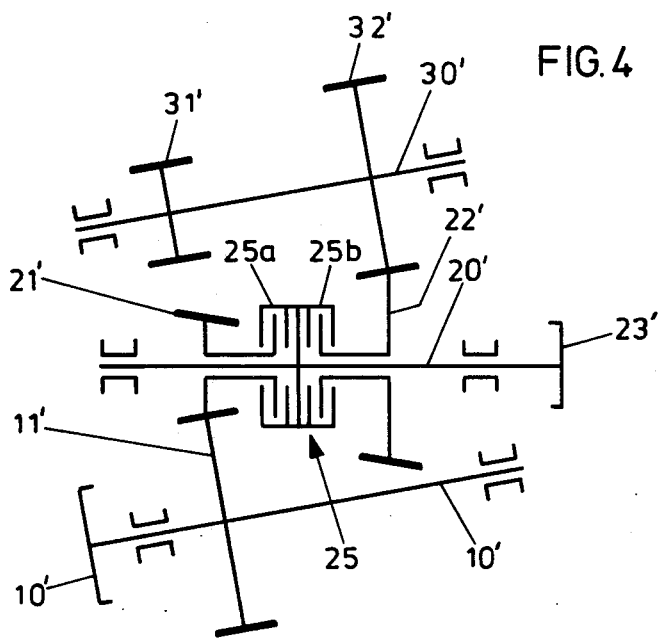
FIG. 4 is a line representation similar to FIG. 3 showing a second embodiment of the present invention in which the output shaft is inclined with respect to the input shaft.

FIG. 4 details another embodiment of the present invention. In this embodiment double-acting clutch 25 is provided comprising clutch section 25a and clutch section 25b. The housing of the clutch is keyed to the input shaft 20' while first input gear 22' and second input gear 21' are journalled rotatably on input shaft 20'. The gears 21' and 22' are attached to the inner lamella of the clutch so that they will not independently rotate. The reversing gear 32' and pinion 31' are fixedly attached to the intermediate shaft 30' and are actuated as will be described in greater detail below.

Figure 3:
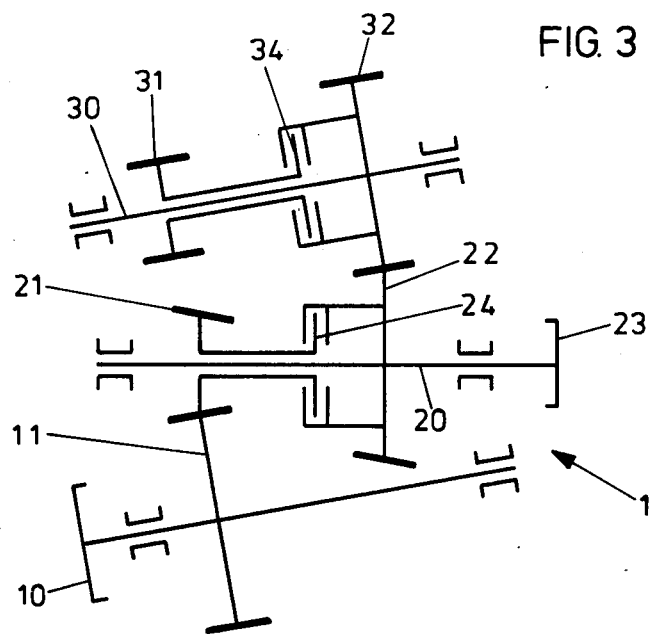
FIG. 3 is a line representation of the assembly shown in FIG. 2.

As shown in FIGS. 2 and 3, the transmission assembly in accordance with the present invention comprises input shaft 20 and intermediate shaft 30. These, together with their respective component parts such as bearings, gears and clutch means are similar or identical. Thus, when interchanging gears 32 and 22, either with or without the clutch portion attached to the radial portions of gear 22 and gear 32 which depends on whether this is removably connected, the function of both shafts are converted as well. For this, only a housing portion that is dissimilar to housing portion 6 is required and shifting of the transmission through an arc designated by $\alpha$ in FIG. 5. Now, shaft 30" functions as the input shaft and the shaft 20" functions as the intermediate shaft. This embodiment is shown in FIG. 6. In this embodiment, the input shaft 30" is parallel with respect to the output shaft 10".

Thus FIG. 6 can be considered to correspond to a section taken along the line III—III of FIG. 5b. From FIGS. 5b and 6 it will be apparent, as has already been described above, the power flow can either proceed via the pinion 31" or via the pinion 21" to the gear wheel 11" upon closure of the clutch 24" or the clutch 34".

The teeth of the various gears in the gear trains thus far described can be of the known bevel type which will permit problem-free inclinations of the shafts with respect to each other as required and, further, due to the interchangability of the gears, the number of variations that can be achieved is increased. Thus, all five gears employed in a transmission can have bevelled, cross-axis skew or hypoid teeth and can be so-called beveloid gear teeth. Alternatively, at least two gears, reversing gears 31, 31' and 32" and their equivalents as well as second input gear 21, 21' and 30" and their equivalents can be provided with beveloid teeth while the remaining teeth in the system can be standard involute gear teeth.

The operation of the transmission system will be described next: A transmission having input and output shafts inclined with respect to each other, as shown in FIGS. 2 and 3, is operated co-currently by disengaging clutch 34 and engaging clutch 24. Thus, motive power is introduced to the system by input end 23 and is transferred to shaft 20 via clutch 24 coupling gear 21 and gear 22. Thus, the gear 21 is engaged and transmits the motive power to gear 11 of the output shaft 10. Fixed intermediate gear 32 and fixed input gear 22 are in idling position with respect to the gear train.

The system just described with respect to co-current operation operates counter-currently by engaging clutch 34 and, simultaneously, disengaging clutch 24. In this event, motive power is transferred from the input end 23, via fixed input gear 22, to the fixed intermediate gear 32. Through the closed clutch 34, coupling gear 32 to pinion 31, the power is transferred to the gear 31 and from thence to output shaft 10 via the output gear 11.

The embodiment shown in FIG. 6, comprising parallel input and output shafts 30" and 10", respectively, operates as described in the foregoing with the exception that the functions of the shafts carrying two gears are now interchanged. Thus, shaft 20", inclined with respect to input shaft 30" and also inclined with respect to output shaft 10", functions as intermediate shaft. The shaft 30", serving as the input shaft in the system, powers the system from the input end 23" via the gears 32" and 21" and 22", 32" and 21", respectively.

The embodiment shown in FIG. 4, comprising a transmission having an inclined input shaft and output shaft and double-acting clutch 25, operates as follows: For co-current operation, clutch portion 25a of the clutch 25 is engaged and, thus, the output shaft 10' is powered via gear 11', second input gear 21' through clutch 25 on shaft 20' from the output end 23'.

For counter-rotation operation of the transmission in accordance with FIG. 4, the clutch portion 25b of clutch 25 is engaged while the clutch portion 25a is disengaged. The motive power, introduced to the system by the input end 23', is transferred from the first fixed input gear 22' to reversing gear 32' and via shaft 30' and pinion 31' to the fixed output gear 11' and, thus, to output shaft 10'.

We claim:
1. A reversing gear transmission for use in ship-propulsion system comprising:
   a transmission housing;
   an output shaft journalled in said housing said output shaft having a fixedly mounted output gear;
   an input shaft journalled in said housing, said input shaft having a first input gear and a second input gear and coupling means for coupling said first input gear and said second input gear, said second input gear being coupled with said output gear; and
   an intermediate shaft journalled in said housing, said intermediate shaft having a first intermediate gear meshing with said first input gear and a second intermediate gear coupled with said output gear, one of said input and intermediate shafts lying parallel to said output shaft and the other being inclined to said outer shaft; and
   means including said coupling means for selectively forming a gear train from said input gear through said intermediate gears to said output gear and from said first input gear to said second input gear and said output gear.

2. Reversing gear transmission defined in claim 1 wherein said input shaft extends inclined with respect to said output shaft and said intermediate shaft extends parallel to said output shaft.

3. The reversing gear transmission defined in claim 1 wherein said intermediate shaft is inclined with respect to said output shaft and said input shaft is parallel with respect to said output shaft and said input shaft is parallel with respect to said output shaft.

4. The reversing gear transmission defined in claim 1 wherein the coupling means for said first input gear and said second input gear is a clutch.

5. The reversing gear transmission defined in claim 4 wherein said first intermediate gear and said second intermediate gear are coupled by a clutch.

6. The reversing gear transmission defined in claim 1 wherein the gear wheels of the gear train have beveloid teeth.

7. The transmission defined in claim 1 wherein the gears of said first intermediate gear and said second output gear have beveloid teeth and the gears of said output gear and said second intermediate gear and said first input gear have involute gear teeth.

8. The reversing gear transmission defined in claim 1 wherein said input shaft comprises:
   an axially fixed, journalled first input gear and an axially fixed, journalled second input gear; and
   double acting clutch means for selectively coupling said second input gear to said input shaft and powering said output shaft through said output gear.

9. The reversing gear transmission defined in claim 8 having double acting clutch means for selectively coupling said first input gear to said first intermediate gear and powering said output gear through said first and second intermediate gear.

* * * * *